(12) United States Patent
Yamamoto et al.

(10) Patent No.: US 6,442,622 B1
(45) Date of Patent: Aug. 27, 2002

(54) DIGITAL SIGNAL PROCESSOR AND DIGITAL SIGNAL PROCESSING METHOD

(75) Inventors: Yusuke Yamamoto; Ritsuo Matsushita; Yasuyuki Muraki, all of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/419,054

(22) Filed: Oct. 15, 1999

(30) Foreign Application Priority Data

Oct. 21, 1998 (JP) .......................................... 10-300000

(51) Int. Cl.⁷ ......................... G06F 13/00; G06F 13/14; G06F 13/16
(52) U.S. Cl. ................... 710/5; 710/4; 710/20; 710/35; 710/39; 710/52; 710/56; 710/69; 710/308
(58) Field of Search ..................... 710/4, 5, 20, 25, 710/39, 52, 56, 69, 308

(56) References Cited

U.S. PATENT DOCUMENTS 5,210,701 A * 5/1993 Hana et al. ..................... 716/1
6,101,583 A * 8/2000 Suzuki ....................... 711/147
6,201,245 B1 * 3/2001 Schrader ..................... 250/349

* cited by examiner

Primary Examiner—Jeffrey Gaffin
Assistant Examiner—Mohammad O. Farooq
(74) Attorney, Agent, or Firm—Morrison & Foerster LLP

(57) ABSTRACT

A digital signal processor and digital signal processing method are provided, which are capable of performing plural kinds of signal processing, and also performing processing for storing sampled data in a manner corresponding to respective kinds of signal processing with a small amount of hardware even in the case where the manner of storing and reading sampled data to be processed with respect to a memory device is different between the plural kinds of signal processing. A storage device stores plural kinds of sampled data corresponding, respectively, to plural kinds of signal processing. A counter updates a count value thereof every sampling period and generates the updated count value as a basic address. A sampled data input and output device performs an input and output operation every sampling period, the input and output operation comprising generating plural kinds of offset addresses corresponding, respectively, to the plural kinds of signal processing and not overlapping with each other, generating at least one write address or read address for the sampled data for each of the plural kinds of signal processing by modifying the basic address by at least one of the offset addresses corresponding to each of the plural kinds of signal processing, and delivering the generated at least one write address or read address to the storage device.

5 Claims, 2 Drawing Sheets

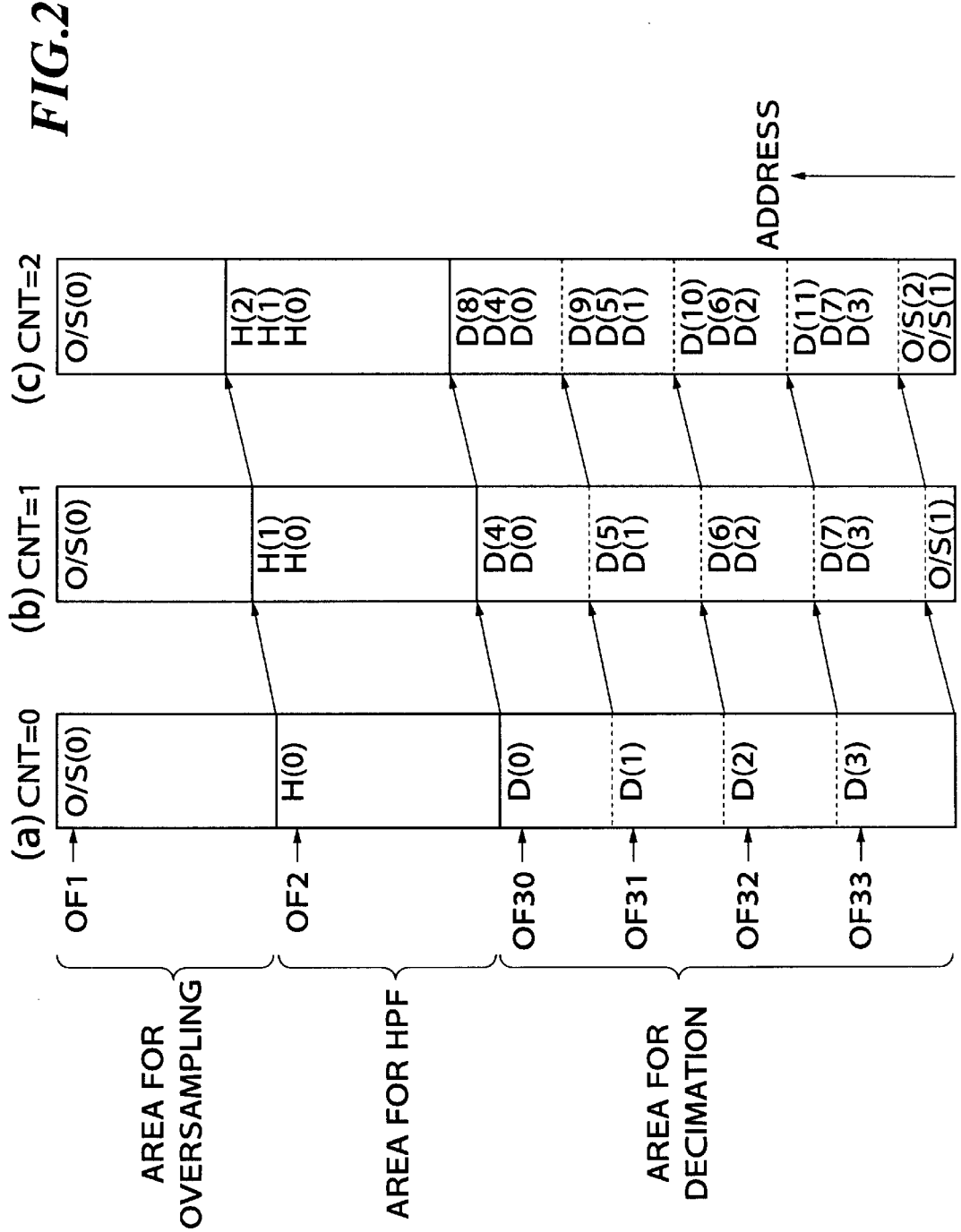

DIGITAL SIGNAL PROCESSOR AND DIGITAL SIGNAL PROCESSING METHOD

BACKGROUND OF THE INVENTION

1. Field of the Invention

The present invention relates to a digital signal processor which is suitable for use in modems or the like, and a method of processing digital signals.

2. Prior Art

Many modems (modulator and demodulators) have a function of changing the sampling frequency of a transmission signal transmitted by a communication network in accordance with the status of the communication network to which they are connected. DSPs (digital signal processors) installed in modems of this kind are required to have a function of changing the sampling frequency of input sampled data, and are therefore generally equipped with oversampling filters and decimation filters, in addition to band pass filters.

Digital filters such as oversampling filters and decimation filters are all constructed such that input sampled data to be processed are once stored in a memory and the stored sampled data are read from the memory. The manner of storing and reading the sampled data is, however, different between the oversampling filters and the decimation filters, i.e. depending upon the kind of signal processing. More specifically, for example, an oversampling filter is constructed such that one piece of sampled data is stored in a memory and a plurality of sampled data are read from the memory during one sampling period, whereas a decimation filter is constructed such that a plurality of sampled data are stored in a memory and one piece of sampled data is read from the memory during one sampling period.

Since the manner of storing and reading the sampled data with respect to the memory is thus different depending upon the kind of signal processing, it is generally difficult to store sampled data corresponding to plural kinds of signal processing in a common memory. Therefore, conventionally, memories and access control means therefor are provided, respectively, for plural kinds of signal processing, such that sampled data is stored in a memory exclusively provided for each kind of signal processing. This, however, necessitates the use of an increased amount of hardware in the DSP.

SUMMARY OF THE INVENTION

It is therefore an object of the present invention to provide a digital signal processor and a digital signal processing method which are capable of performing plural kinds of signal processing, and also performing processing for storing sampled data in a manner corresponding to respective kinds of signal processing with a small amount of hardware even in the case where the manner of storing and reading sampled data to be processed with respect to a memory device is different between the plural kinds of signal processing.

To attain the above object, the present invention provides a digital signal processor comprising a storage device that stores plural kinds of sampled data corresponding, respectively, to plural kinds of signal processing, a counter that updates a count value thereof every sampling period and generates the updated count value as a basic address, and a sampled data input and output device that performs an input and output operation every sampling period, the input and output operation comprising generating plural kinds of offset addresses corresponding, respectively, to the plural kinds of signal processing and not overlapping with each other, generating at least one write address or read address for the sampled data for each of the plural kinds of signal processing by modifying the basic address by at least one of the offset addresses corresponding to each of the plural kinds of signal processing, and delivering the generated at least one write address or read address to the storage device.

In a preferred form of the invention, the plural kinds of signal processing include at least one kind of signal processing which includes a process of storing a plurality of sampled data in the storage device or reading a plurality of sampled data from the storage device every sampling period, the sampled data input and output device performing the input and output operation every sampling period, the input and output operation comprising generating a plurality of offset addresses corresponding to the at least one kind of signal processing, generating a plurality of write addresses or read addresses for the sampled data for the at least one kind of signal processing by modifying the basic address by the plurality of offset addresses, and delivering the generated plurality of write addresses or read addresses to the storage device.

In a preferred embodiment of the invention, the plural kinds of signal processing include 1/M-fold decimation processing which includes a process of storing M pieces of sampled data (M is an integer) in the storage device and reading one piece of sampled data from the storage device every sampling period, the sampled data input and output device performing an input and output operation every sampling period, the input and output operation comprising generating M offset addresses for writing corresponding to said 1/M-fold decimation processing, generating M write addresses which differ from each other by modifying the basic address by the M offset addresses for writing, delivering the generated M write addresses to the storage device, generating one offset address for reading corresponding to the 1/M-fold decimation processing, generating one read address by modifying the basic address by the one offset address for reading, and delivering the generated one read address to the storage device.

Further, in a preferred embodiment of the invention, the plural kinds of signal processing include K-times oversampling processing which includes a process of storing one piece of sampled data in the storage device and reading J pieces of sampled data (J is an integer) from the storage device K times (K is an integer) every sampling period, the sampled data input and output device performing an input and output operation every sampling period, the input and output operation comprising generating M offset addresses for writing corresponding to the 1/M-fold decimation processing, generating M write addresses which differ from each other by modifying the basic address by the M offset addresses for writing, delivering the generated M write addresses to the storage device, generating one offset address for reading corresponding to the 1/M-fold decimation processing, generating one read address by modifying the basic address by the one offset address for reading, and delivering the generated one read address to the storage device.

To attain the above object, the present invention provides a digital signal processing method comprising a storing step of storing plural kinds of sampled data corresponding, respectively, to plural kinds of signal processing in a storage device, a counting step of updating a count value of a counter every sampling period and generating the updated count value as a basic address, and an input or output step of performing an input and output operation every sampling period, the input and output operation comprising generating plural kinds of offset addresses corresponding, respectively, to the plural kinds of signal processing and not overlapping with each other, generating at least one write address or read address for the sampled data for each of the plural kinds of signal processing by modifying the basic address by at least one of the offset addresses corresponding to each of the plural kinds of signal processing, and delivering the generated at least one write address or read address to the storage device.

BRIEF DESCRIPTION OF THE DRAWINGS

FIG. 2 is a view showing plural kinds of sampled data stored in a RAM of the digital signal processor.

DETAILED DESCRIPTION OF PREFERRED EMBODIMENT

Figure 1:
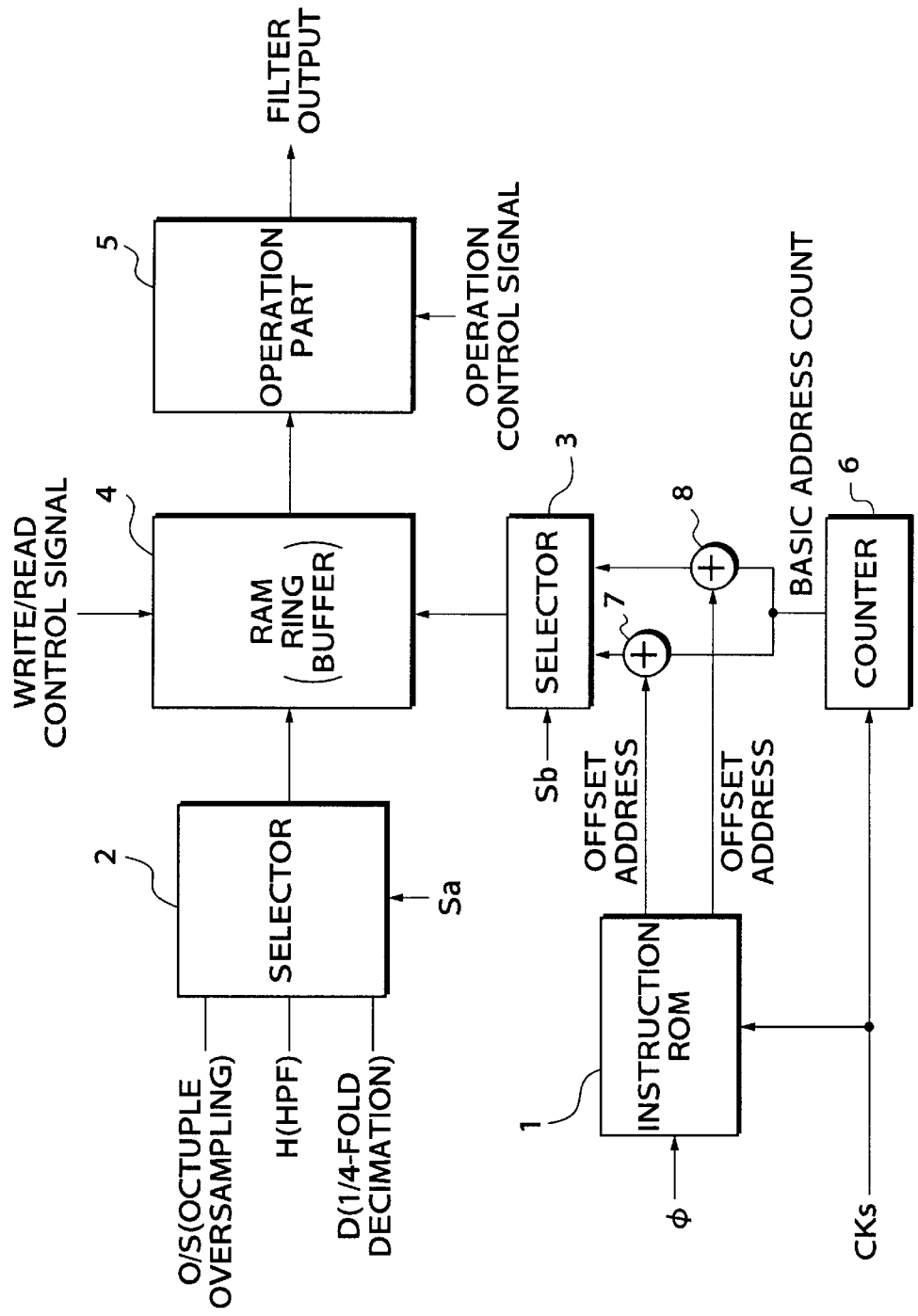
FIG. 1 is a block diagram showing the configuration of a digital signal processor (DSP) according to an embodiment of the present invention.

The present invention will be described in detail with reference to the drawings showing a preferred embodiment thereof.

FIG. 1 shows the configuration of a digital signal processor (hereinafter referred to as "the DSP") according to one embodiment of the present invention. In FIG. 1, reference numeral 1 designates an instruction ROM (Read Only Memory) which stores a series of instruction codes used for performing plural kinds of digital signal processing.

The instruction ROM 1 includes a read address counter, not shown, for generating the stored series of instruction codes. The read address counter is reset by a sampling clock CKs generated every sampling period 1/fs, to perform counting of an instruction reading clock which is higher in frequency than the sampling clock CKs. The instruction ROM 1 converts the resulting count value to a read address and generates an instruction code specified by the read address.

The DSP performs plural kinds of digital signal processing which include octuple oversampling processing, high pass filter (HPF) processing, and 1/4-fold decimation processing. The instruction ROM 1 stores instruction codes corresponding to these kinds of signal processing, and these instruction codes are read from the instruction ROM 1 every sampling period.

The instruction codes read from the instruction ROM 1 are constituted by a variety of control information which are delivered to various portions of the DSP. In the example of FIG. 1, as these control information, a select signal Sa is delivered to a selector 2, a select signal Sb to a selector 3, a write/read control signal to a RAM 4, an operation control signal to an operation part 5, and offset addresses to adders 7 and 8, respectively. These control information include control information forming part of an instruction code or codes read from the instruction ROM 1, and control information formed from such control information. The offset address delivered to the adder 7 is information contained in an instruction code that commands that sampled data should be written into the RAM 4. The offset address delivered to the adder 8 is information contained in an instruction code that commands that sampled data should be read from the RAM 4. These offset addresses are used to modify a write address and a read address for writing and reading sampled data corresponding to each kind of signal processing. In the present embodiment, a plurality of offset addresses are determined which correspond, respectively, to the octuple oversampling processing, HPF processing, and 1/4-fold decimation processing, and are contained in respective corresponding instruction codes.

The selector 2 receives sampled data O/S to be processed in the octuple oversampling processing, sampled data H to be processed in the HPF processing, and sampled data D to be processed in the 1/4-fold decimation processing. The selector 2 also receives the select signal Sa for selecting these sampled data from the instruction ROM 1. The selector 2 selects the sampled data according to the select signal Sa, and delivers one piece of sampled data O/S or H thus selected to the RAM 4 during one sampling period, and four pieces of sampled data D thus selected to the RAM 4 during one sampling period.

The selector 3 selects a write address generated from the adder 7 or a read address generated from the adder 8 according to the select signal Sb delivered from the instruction ROM 1, and delivers the selected write address or read address to an address terminal of the RAM 4. The method of generating the write address and the read address will be described hereinafter.

The RAM 4 is a storage device that stores the sampled data O/S, H, and D delivered from the selector 2. Storage locations in the RAM 4 for these sampled data are specified by the write address delivered from the selector 3, and sampled data to be read from the RAM 4 are specified by the read address delivered from the selector 3. Changeover between a writing operation and a reading operation of the RAM 4 is carried out in response to the write/read control signal from the instruction ROM 1. The RAM 4, which thus receives the addresses from the selector 3 and the write/read control signal from the instruction ROM 1, functions as a ring buffer that stores the sampled data from the selector 2 and delivers the same to the operation part 5 in appropriate timing.

The operation part 5 performs arithmetic operations such as coefficient convolution processing on the sampled data read from the RAM 4. The operation control signal delivered to the operation part 5 from the instruction ROM 1 also contains coefficients used for filtering operations of the plural kinds of digital signal processing.

A counter 6 counts the sampling clock CKs, and generates the resulting count value as a basic address CNT. The counting range of the counter 6 coincides with the address range of the RAM 4 that is used as a ring buffer for storing sampled data. More specifically, for example, if M areas from address 0 to address M−1 of the RAM 4 constitute the ring buffer for storing sampled data, the counter 6 is adapted to count from "0" to "M−1".

The adder 7 adds up an offset address delivered from the instruction ROM 1 when sampled data is to be written into the RAM 4, and a basic address CNT delivered from the counter 6, and generates the resulting sum as a write address. The adder 8 adds up an offset address delivered from the instruction ROM 1 when sampled data is to be read from the RAM 4, and a basic address CNT delivered from the counter 6, and generates the resulting sum as a read address.

The operation of the present embodiment constructed as above will now be described.

As described above, in the present embodiment, the series of instruction codes corresponding to the octuple oversampling processing, HPF processing, and 1/4-fold decimation processing are read from the instruction ROM 1 every sampling period. These kinds of filtering processing each include a process of writing sampled data to be processed by the filtering processing into the RAM 4, and a process of reading sampled data from the RAM 4.

Now, the process of writing sampled data into the RAM 4 will be described. First, when in a certain sampling period an instruction code commanding that the sampled data O/S to be processed in the octuple oversampling processing should be written into the RAM 4, is read from the instruction ROM 1, the select signal Sa for selecting the sampled data O/S, the select signal Sb for selecting the output signal of the adder 7, and the write control signal commanding that the sampled data should be written into the RAM 4 are delivered to the selectors 2, 3 and the RAM 4, respectively. The selector 2 operates in response to the select signal Sa to selectively allow sampled data O/S then supplied to the DSP (e.g. sampled data O/S(0)) to be delivered to the RAM 4. The above instruction code contains a predetermined offset address OF1 corresponding to the sampled data O/S, which is delivered from the instruction ROM 1 to the adder 7. The adder 7 then adds up this offset address OF1 and the basic address CNT from the counter 6, and the selector 3 selects the resulting sum from the adder 7 and delivers the same as a write address to the RAM 4. Accordingly, the sampled data O/S(0) is written into an area in the RAM 4 that corresponds to the write address.

Also in the case where an instruction code commanding that the sampled data H to be processed in the HPF processing should be written into the RAM 4 is read from the instruction ROM 1, similar control signals (select signals, etc.) to those generated in the case of the sampled data O/S are generated, and sampled data H then supplied to the DSP (e.g. sampled data H(0)) is delivered from the selector 2 to the RAM 4. The above instruction code contains an offset address OF2 corresponding to the sampled data H. The sum of this offset address OF2 and the basic address CNT is delivered as a write address to the RAM 4, so that the sampled data H(0) is written into an area in the RAM 4 that corresponds to the write address.

In the case of the 1/4-fold decimation processing, as is distinct from the above two kinds of filtering processing, four instruction codes commanding that four pieces of sampled data D should be written into the RAM 4 are sequentially read from the instruction ROM 1 during one sampling period. These four instruction codes, each of which commands its corresponding sampled data D to be written into the RAM 4, contain respective predetermined offset addresses OF30 to OF33 which differ from each other by "4".

Therefore, when these instruction codes are sequentially read from the instruction ROM 1, the four sampled data to be processed within the present sampling period (e.g. sampled data D(0) to D(3)) are sequentially delivered from the selector 2 to the RAM 4, and in synchronism with this, the sums of the offset addresses OF30 to OF33 and the basic address CNT are sequentially delivered as write addresses to the RAM 4. Accordingly, the sampled data D(0) to D(3) are stored, respectively, into four areas in the RAM 4 which are separated from each other by four addresses.

Referring to FIG. 2, column (a) shows the sampled data O/S(0), H(0), and D(0) to D3 which have been written into the RAM 4 in the above described manner, by way of example. The sampled data O/S(0), sampled data H(0), and sampled data D(0) to D(3) follow older sampled data of the respective same kinds which were input to the DSP earlier.

In the present embodiment, as shown in FIG. 2, the storage area of the RAM 4 is divided into an area for oversampling processing, an area for HPF processing, and an area for decimation processing, and sampled data of the three kinds are stored in the respective corresponding divided areas, that is, stored in a separated manner. Further, the area for decimation processing is subdivided into four subareas in which the four sampled data for decimation processing generated within one sampling period are stored, respectively, in a separated manner. The positional relationship between the area for oversampling processing, the area for HPF processing, and the area for decimation processing is determined by the offset addresses OF1, OF2, and OF30. The positional relationship between the four areas for the four sampled data D(0) to D(3) for decimation processing is determined by the offset addresses OF30 to OF33. In the example of column (a) of FIG. 2 which corresponds to the present sampling period, the basic address CNT is "0". Accordingly, as shown in FIG. 2, the sampled data O/S(0), H(0), and D(0) to D(3) are stored at locations just corresponding, respectively, to the addresses OF1, OF2, and OF30 to OF33 in the RAM 4.

Next, when the sampling period has changed, the instruction codes commanding writing of sampled data corresponding to the octuple oversampling processing, HPF processing, and 1/4-fold decimation processing are again read from the instruction ROM 1. Also in this new sampling period, write addresses are generated using offset addresses OF1, OF2, and OF30 to OF33 contained in these instruction codes. However, in the new sampling period, the basic address is incremented by "1", and accordingly the write address for each of the sampling data is incremented by "1" from the value generated in the immediately preceding sampling period. Therefore, as shown in column (b) of FIG. 2, sampled data O/S(1), H(1), and D(4) to D(7) delivered to the RAM 4 in the new sampling period are stored at locations which are each advanced by one address from a corresponding one of the locations in which the sampled data O/S(0), H(0), and D(0) to D(3) are stored.

Similar operations are carried out in the following sampling period, so that new sampled data O/S(2), H(2), and D(8) to D(11) are stored in the RAM 4 at locations which are each advanced by one address from a corresponding one of the locations in which the sampled data O/S(1), H(1), and D(4) to D(7) are stored. Similar operations are also carried out in the subsequent sampling periods.

Next, the manner of reading the sampled data from the RAM 4 will be described.

First, in the octuple oversampling processing, a convolution operation is performed on n pieces of sampled data D (n is an integer indicative of the order of interpolation carried out in the oversampling processing) so far stored in the RAM 4 to generate eight pieces of sampled data during one sampling period, which have a sampling frequency eight times higher than that of the original sampled data. To cope with this octuple oversampling processing, in the present embodiment, n×8 instruction codes which command that sampled data to be processed by the octuple oversampling processing should be read from the RAM 4 are stored in the instruction ROM 1.

Among the n×8 instruction codes, the first n instruction codes contain not only information for commanding reading from the RAM 4, but also offset addresses OF1, OF1−1, OF1−2, . . . , OF1-n+1 corresponding, respectively, to n pieces of sampled data O/S, as well as n filter coefficients by which the sampled data are multiplied by the operation part 5.

When each of the n instruction codes is read from the instruction ROM 1, the select signal Sb for selecting the output signal of the adder 8 and a reading command for the RAM 4 are delivered to the selector 3 and the RAM respectively. The offset addresses OF1, OF1-1, OF1-2, ... , OF1-n+1 contained in the n instruction codes read from the instruction ROM 1 are sequentially delivered to the adder 8, while the n filter coefficients contained in the n instruction codes are delivered to the operation part 5.

The adder 8 sequentially generates n successive read addresses CNT+OF1, CNT+OF1-1, ... , CNT+OF1-n+1, which are delivered through the selector 3 to the RAM 4. Consequently, eight pieces of sampled data corresponding to the respective read addresses are read from the RAM 4 and delivered to the operation part 5. More specifically, as shown in column (a) of FIG. 2, for example, when the sampled data O/S(0) is stored in the RAM 4 in a certain sampling period, this sampled data O/S(0) and sampled data O/S(−1) to O/S(−n+1) which were written into the RAM 4 earlier than the sampled data O/S(O) are read from the RAM 4 and delivered to the operation part 5.

The operation part 5 performs a convolution operation on these n pieces of sampled data using the n filter coefficients delivered from the instruction ROM 1, to thereby generate a first piece of sampled data out of eight pieces of sampled data to be generated within the sampling period.

As is the case with the first n instruction codes, the second n instruction codes also contain offset addresses OF1, OF1-1, OF1-2, ... , OF1-n+1 corresponding, respectively, to n pieces of sampled data O/S, as well as n filter coefficients by which the sampled data are multiplied. The filter coefficients contained in the second n instruction codes are, however, used to obtain a second piece of sampled data which differs in phase from the first piece of sampled data, and therefore have different values from those of the filter coefficients contained in the first n instruction codes. The third n instruction codes to the eighth n instruction codes are identical with the second n instruction codes. The second n instruction codes to the eighth n instruction codes are executed in the same manner as the first n instruction codes so that the convolution operation is carried out on the n pieces of sampled data to generate second to eighth sampled data.

When the sampling period has changed, the basic address CNT is incremented by "1" so that n pieces of sampled data, which were written into the RAM 4 later by one sampling period than respective corresponding ones of the n pieces of sampled data read from the RAM 4 in the immediately preceding sampling period, are read from the RAM 4, so that eight sampled data are generated by the operation part 5 in the same manner as described above.

The reading operation of the sampled data H in the HPF processing is carried out in a similar manner to the manner in which the reading operation of the sampled data O/S in the octuple oversampling processing is carried out. That is, during one sampling period sampled data H required for the HPF processing are read from the RAM 4 and delivered to the operation part 5. In this case as well, the sampled data delivered from the RAM 4 to the operation part 5 are determined by offset addresses in instruction codes read from the instruction ROM 1, as is the case with the sampled data O/S.

In the 1/4-fold decimation processing, one piece of sampled data out of a train of four pieces of sampled data sequentially written into the RAM 4 is read from the RAM 4 every sampling period. To perform this decimation processing, in the present embodiment, as an instruction code that commands reading of sampled data D for the decimation processing, an instruction code containing the offset address OF30 is stored in the instruction ROM 1.

In each sampling period, the instruction code that commands reading of sampled data D for the decimation processing is read from the instruction ROM 1. The offset address OF30 contained in the instruction code and the basic address CNT available in the present sampling period are added up to generate a read address, which is delivered to the RAM 4, so that sampled data D corresponding to the read address is read from the RAM 4. Consequently, one piece of sampled data is selected out of four pieces of original or written sampled data and read from the RAM 4 in such a sequential manner that, for example, in a certain sampling period, sampled data D(0) is selected and read from the RAM 4, in the next sampling period, sampled data D(4) is selected and read from the RAM 4, and in the further next sampling period sampled data D(8) is selected and read from the RAM 4, and so forth. This manner of reading will be easily understood from column (c) of FIG. 2 showing, by way of example, the state of storage of sampled data in the area for decimation processing.

Although in the above described embodiment the decimation processing is 1/4-fold decimation processing, the present invention is not limited to this. The present invention may be applied to a DSP which performs any 1/M-fold decimation processing. In this case, M different offset addresses may be provided for M pieces of sampled data to be written into the RAM 4 during one sampling period, and addresses of the RAM 4 for storing the sampled data may be determined using the offset addresses and the basic address.

Further, the kinds of signal processing executed by the DSP are not limited to those employed in the above described embodiment. For example, the present invention may be applied to a DSP which performs oversampling processing, 1/M-fold decimation processing, and 1/L-fold decimation processing (L>M). In this case, one offset address, M offset addresses, and L offset addresses may be provided, respectively, for the oversampling processing, the 1/M-fold decimation processing, and the 1/L-fold decimation processing, and addresses for storing the sampled data for these kinds of signal processing may be determined using the above offset addresses and the basic address.

As described above, the digital signal processor of the present invention comprises a storage device that stores plural kinds of sampled data corresponding, respectively, to plural kinds of signal processing, a counter that updates its count value every sampling period and generates the updated count value as a basic address, and a sampled data input and output device that generates plural kinds of offset addresses corresponding, respectively, to the plural kinds of signal processing and not overlapping with each other every sampling period, generates at least one write address or read address for the sampled data for each of the plural kinds of signal processing every sampling period, by modifying the basic address by at least one of the offset addresses corresponding to each of the plural kinds of signal processing, and delivers the generated at least one write address or read address to the storage device. As a result, a resource for storing sampled data to be processed in the plural kinds of signal processing (storage device, counter, and sampled data input and output device) can be shared by the plural kinds of signal processing, to thereby reduce the amount of required hardware.

It is to be understood that the above described embodiment is to be taken as a preferred embodiment of the invention and that various changes and modifications may be made in the invention without departing from the spirit and scope thereof.

What is claimed is:

1. A digital signal processor comprising:
   a storage device that stores plural kinds of sampled data corresponding, respectively, to plural kinds of signal processing;
   a counter that updates a count value thereof every sampling period and generates the updated count value as a basic address; and
   a sampled data input and output device that performs an input and output operation every sampling period, the input and output operation comprising generating plural kinds of offset addresses corresponding, respectively, to the plural kinds of signal processing and not overlapping with each other, generating at least one write address or read address for the sampled data for each of the plural kinds of signal processing by modifying the basic address by at least one of the offset addresses corresponding to each of the plural kinds of signal processing, and delivering the generated at least one write address or read address to the storage device.

2. A digital signal processor as claimed in claim 1, wherein said plural kinds of signal processing include at least one kind of signal processing which includes a process of storing a plurality of sampled data in said storage device or reading a plurality of sampled data from said storage device every sampling period, said sampled data input and output device performing said input and output operation every sampling period, the input and output operation comprising generating a plurality of offset addresses corresponding to said at least one kind of signal processing, generating a plurality of write addresses or read addresses for the sampled data for the at least one kind of signal processing by modifying the basic address by the plurality of offset addresses, and delivering the generated plurality of write addresses or read addresses to the storage device.

3. A digital signal processor as claimed in claim 1, wherein said plural kinds of signal processing include 1/M-fold decimation processing which includes a process of storing M pieces of sampled data (M is an integer) in said storage device and reading one piece of sampled data from said storage device every sampling period, said sampled data input and output device performing an input and output operation every sampling period, the input and output operation comprising generating M offset addresses for writing corresponding to said 1/M-fold decimation processing, generating M write addresses which differ from each other by modifying the basic address by the M offset addresses for writing, delivering the generated M write addresses to the storage device, generating one offset address for reading corresponding to said 1/M-fold decimation processing, generating one read address by modifying the basic address by the one offset address for reading, and delivering the generated one read address to the storage device.

4. A digital signal processor as claimed in claim 1, wherein said plural kinds of signal processing include K-times oversampling processing which includes a process of storing one piece of sampled data in said storage device and reading J pieces of sampled data (J is an integer) from said storage device K times (K is an integer) every sampling period, said sampled data input and output device performing an input and output operation every sampling period, the input and output operation comprising generating M offset addresses for writing corresponding to said 1/M-fold decimation processing, generating M write addresses which differ from each other by modifying the basic address by the M offset addresses for writing, delivering the generated M write addresses to the storage device, generating one offset address for reading corresponding to said 1/M-fold decimation processing, generating one read address by modifying the basic address by the one offset address for reading, and delivering the generated one read address to the storage device.

5. A digital signal processing method comprising:
   a storing step of storing plural kinds of sampled data corresponding, respectively, to plural kinds of signal processing in a storage device;
   a counting step of updating a count value of a counter every sampling period and generating the updated count value as a basic address; and
   an input or output step of performing an input and output operation every sampling period, the input and output operation comprising generating plural kinds of offset addresses corresponding, respectively, to the plural kinds of signal processing and not overlapping with each other, generating at least one write address or read address for the sampled data for each of the plural kinds of signal processing by modifying the basic address by at least one of the offset addresses corresponding to each of the plural kinds of signal processing, and delivering the generated at least one write address or read address to the storage device.

* * * * *